US010477378B2

United States Patent
Montemurro et al.

(10) Patent No.: US 10,477,378 B2
(45) Date of Patent: Nov. 12, 2019

(54) WIRELESS NETWORK DISCOVERY USING A MIMO TRANSCEIVER

(71) Applicant: BlackBerry Limited, Waterloo (CA)

(72) Inventors: Michael Peter Montemurro, Toronto (CA); Lucas Dobrowolski, Thornhill (CA); Konrad Hammel, Waterloo (CA); Stephen McCann, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 48 days.

(21) Appl. No.: 15/136,196

(22) Filed: Apr. 22, 2016

(65) Prior Publication Data

US 2017/0311142 A1    Oct. 26, 2017

(51) Int. Cl.
*H04W 8/00* (2009.01)
*H04W 76/10* (2018.01)
*H04B 7/0413* (2017.01)
*H04W 76/14* (2018.01)

(52) U.S. Cl.
CPC ......... *H04W 8/005* (2013.01); *H04B 7/0413* (2013.01); *H04W 76/10* (2018.02); *H04W 76/14* (2018.02)

(58) Field of Classification Search
CPC ..... H04W 8/005; H04W 76/02; H04W 76/10; H04W 48/08; H04W 48/16; H04W 48/18; H04W 76/14; H04W 76/15; H04B 7/02; H04B 7/0413
USPC ...................................................... 370/329
See application file for complete search history.

(56) References Cited

U.S. PATENT DOCUMENTS

| 8,694,039 | B2 | 4/2014 | Jalloul |
| 8,730,915 | B2 | 5/2014 | Cheng |
| 8,819,219 | B2* | 8/2014 | Vandwalle ............... H04L 67/16 709/224 |
| 2006/0095954 | A1* | 5/2006 | Buckley ................... H04L 63/08 726/2 |
| 2007/0165875 | A1 | 7/2007 | Rezvani |
| 2009/0137206 | A1* | 5/2009 | Sherman ................ H04W 16/14 455/41.2 |
| 2009/0232061 | A1 | 9/2009 | Rajamani |
| 2010/0316003 | A1* | 12/2010 | Sukiasyan ............. H04W 72/02 370/329 |
| 2010/0322213 | A1 | 12/2010 | Liu |
| 2012/0011247 | A1 | 1/2012 | Mallik et al. |
| 2012/0094594 | A1* | 4/2012 | Rofougaran .......... G06F 1/1626 455/15 |
| 2013/0007853 | A1 | 1/2013 | Gupta |
| 2013/0072189 | A1* | 3/2013 | Cheng ................ H04W 36/0083 455/436 |

(Continued)

OTHER PUBLICATIONS

Liu et al., U.S. Appl. No. 62/188,891, filed Jul. 6, 2015.*

(Continued)

*Primary Examiner* — Un C Cho
*Assistant Examiner* — Shah M Rahman
(74) *Attorney, Agent, or Firm* — Trop, Pruner & Hu, P.C.

(57) ABSTRACT

In some examples, a wireless device includes a multiple-input, multiple-output (MIMO) transceiver that has a plurality of antennas to perform MIMO wireless communication. At least one processor is configured to concurrently perform discovery of respective different wireless devices using at least two of the plurality of antennas.

20 Claims, 2 Drawing Sheets

(56) References Cited

U.S. PATENT DOCUMENTS

| | | | | |
|---|---|---|---|---|
| 2013/0109315 | A1* | 5/2013 | Polo | H04W 52/0274 |
| | | | | 455/41.2 |
| 2013/0230035 | A1* | 9/2013 | Grandhi | H04W 48/16 |
| | | | | 370/338 |
| 2013/0273913 | A1* | 10/2013 | Swaminathan | H04W 48/16 |
| | | | | 455/434 |
| 2013/0294354 | A1* | 11/2013 | Zhang | H04W 72/04 |
| | | | | 370/329 |
| 2014/0038623 | A1 | 2/2014 | Davydov et al. | |
| 2014/0185598 | A1* | 7/2014 | Canpolat | H04W 48/16 |
| | | | | 370/338 |
| 2014/0355527 | A1* | 12/2014 | Vaidya | H04W 76/025 |
| | | | | 370/329 |
| 2014/0376392 | A1* | 12/2014 | Hegde | H04W 48/16 |
| | | | | 370/252 |
| 2015/0119052 | A1* | 4/2015 | Caimi | H01Q 5/22 |
| | | | | 455/450 |
| 2015/0127733 | A1* | 5/2015 | Ding | H04W 4/08 |
| | | | | 709/204 |
| 2015/0156722 | A1 | 6/2015 | Kim et al. | |
| 2015/0296544 | A1 | 10/2015 | Kim et al. | |
| 2015/0373531 | A1* | 12/2015 | Goel | H04W 8/186 |
| | | | | 370/328 |
| 2016/0088640 | A1* | 3/2016 | Huang | H04W 4/028 |
| | | | | 370/329 |
| 2016/0100304 | A1 | 4/2016 | Kim et al. | |
| 2016/0212695 | A1* | 7/2016 | Lynch | H04W 48/08 |
| 2016/0353470 | A1* | 12/2016 | Liu | H04L 65/4076 |
| 2018/0041947 | A1* | 2/2018 | Pang | H04W 48/16 |

OTHER PUBLICATIONS

Cisco—https://documentation.meraki.com/MR/WiFi_Basics_and_Best_Practices/802.11_Association_process_explained—802.11 Association process explained—Cisco Meraki downloaded Mar. 3, 2016 (2 pages).
Bahl et al., Microsoft Research, Reconsidering Wireless Systems with Multiple Radios, 2004 (8 pages).
Wikipedia, Generic Advertisement Service last modified Mar. 2, 2015 (3 pages).
Wikipedia, MIMO last modified Mar. 2, 2016 (24 pages).
Wikipedia, Near-me area network modified Apr. 27, 2015 (4 pages).
Wikipedia, Network detector modified Jul. 17, 2015 (3 pages).
Eng Hwee Ong, 2012 IEEE 23rd International Symposium on Personal, Indoor and Mobile Radio Communications—(PIMRC), Performance Analysis of Fast Initial Link Setup for IEEE 802.11ai WLANs, 2012 (6 pages).
http://whatis.techtarget.com/definition/Access-Network-Query-Protocol-ANQP—What is Access Network Query Protocol (ANQP)?—Definition from WhatIs.com downloaded Mar. 3, 2016 (18 pages).
Wi-Fi Alliance, Wi-Fi Aware to bring proximity-based service discovery to Wi-Fi Certified devices later this year, Devices will be aware of nearby services before connecting, Jan. 16, 2015 (3 pages).
Canadian Intellectual Property Office, International Search Report and Written Opinion for PCT/CA2017/050487 dated Jul. 31, 2017 (11 pages).
EEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.
European Patent Office, Supplementary Partial European Search Report for Appl. No. 17785203.5 dated Dec. 10, 2018 (25 pages).
European Patent Office, Extended European Search Report for Appl. No. 17785203.5 dated Mar. 18, 2019 (20 pages).

* cited by examiner

WIRELESS NETWORK DISCOVERY USING A MIMO TRANSCEIVER

BACKGROUND

Wireless devices can communicate with other endpoints using a wireless network. An example of a wireless network includes a wireless local area network (WLAN), which has access points (APs) with which wireless devices are able to wirelessly connect to perform communications of data. In other examples, wireless networks can include cellular networks or other types of networks.

BRIEF DESCRIPTION OF THE DRAWINGS

Some implementations are described with respect to the following figures.

DETAILED DESCRIPTION

Figure 1:
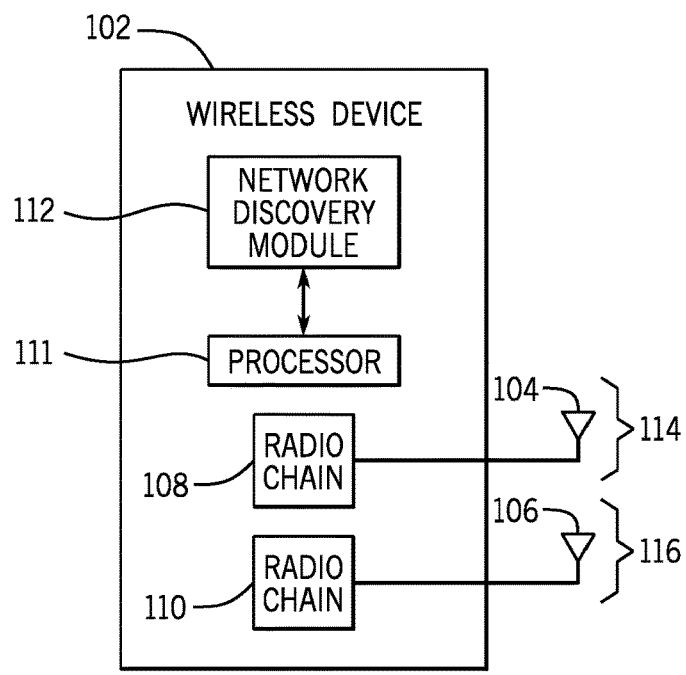
FIG. 1 is a block diagram of an example wireless device including a multiple-input, multiple-output (MIMO) transceiver that can be configured to be used as individual single-input, single-output (SISO) transceivers according to some implementations.

A wireless device can perform network discovery to discover a wireless network, such as a wireless local area network (WLAN) and operates according to the Institute of Electrical and Electronics Engineers (IEEE) 802.11 standards or Wi-Fi Alliance standards. A WLAN can include one or more access points (APs). An AP refers to a network node with which wireless devices are able to establish wireless connections, such that the wireless devices can communicate data with other endpoints coupled to a network that is connected to the AP.

In other examples, a wireless device can discover a wireless network made up of a group of wireless devices that operate according to Wi-Fi Direct. Wi-Fi Direct is a mechanism for a peer-to-peer network built on top of the IEEE 802.11 WLAN protocols (also referred to as Wi-Fi Peer to Peer (P2P)). Wi-Fi Direct is specified by standards provided by the Wi-Fi Alliance (WFA). Wi-Fi Direct Devices use scanning mechanisms to discover each other before negotiating roles. An arrangement of wireless devices that are able to communicate according to Wi-Fi Direct Device includes the roles of a P2P Device, P2P Group Owner (GO) and P2P Clients. A P2P Device is a WFA P2P compatible device that is capable of acting as both a P2P GO and a P2P Client. Wi-Fi Direct Devices search for each other prior to negotiated roles of Group Owner and Client. The GO operates as an AP, while the clients operate as non-AP stations (STAs). A Wi-Fi Direct group provides an example of a wireless network that is formed with the AP implemented using a wireless device (as a GO) instead of a fixed infrastructure node.

In other examples, a wireless device can discover a wireless network according to another protocol, such as a cellular network. An example cellular network can operate according to the Long-Term Evolution (LTE) or Evolved Universal Mobile Telecommunications System Terrestrial Radio Access (E-UTRA) standards, as provided by the Third Generation Partnership Project (3GPP). In other examples, cellular networks can operate according to other protocols. In a cellular network, wireless access network nodes can be referred to as base stations, radio access network nodes, eNodeBs, and so forth.

Generally, an "access point" or "AP" as used herein can refer to an AP of a WLAN, a GO of a Wi-Fi Direct group, or a wireless access network node of a cellular network, as examples.

Examples of wireless devices can include any of the following: a portable computer, a smart phone, a tablet computer, a game appliance, a personal digital assistant (PDA), a wearable device (e.g., a smart watch, smart eyeglasses, etc.), a desktop computer, a vehicle (or an electronic device in a vehicle), a health monitor, or any other type of electronic device that is capable of performing wireless communications in a wireless network.

In some examples, discovery of a wireless network (or more specifically, an AP in the wireless network) can be performed by active scanning, which involves the wireless device sending a probe request. If an AP detects such a probe request, the AP sends a probe response that is received by the wireless device. In some examples, the probe response can include a Service Set Identifier (SSID), which is an identifier of a WLAN. More generally, network discovery by a wireless device can include the wireless device transmitting an indication (such as in the form of a message, an information field, or other information element), and receiving a response if the indication transmitted by the wireless device is detected by an AP in the wireless network. The response can be in the form of a message, an information field, or other information element, and can include information relating to the wireless network that the AP is part of—such information can include an identifier of the wireless network (e.g., an SSID or other identifier), and/or one or more parameters relating to other attributes of the wireless network. An identifier of a wireless network can be in the form of a numeric string, an alphanumeric string, a name, or any other information that can be used to uniquely identify the wireless network.

In other examples, passive scanning can be performed by the wireless device. With passive scanning, the wireless device does not transmit probe requests or other types of indications for purposes of network discovery. In passive scanning, the wireless device listens for any discovery information that is transmitted (e.g., broadcast) by an AP of a wireless network. For example, the AP may send out an SSID or other identifier of the wireless network.

Some wireless devices are capable of performing multiple-input, multiple-output (MIMO) communications, which is a technique to increase the capacity of a wireless link using multiple transmit and receive antennas to exploit multipath propagation of signals that carry data or other information. FIG. 1 illustrates an example wireless device 102 that includes multiple antennas 104 and 106 that can be used for performing MIMO communications over respective paths established using respective different ones of the antennas 104 and 106. A "path" can refer to a channel that can be used to carry signaling over the air. The channel can refer to a timeslot, a frequency carrier, a code, or any combination of the foregoing.

Although just two antennas 104 and 106 are shown in the example of FIG. 1, it is noted that the wireless device 102 in other examples can include more than two antennas. Each antenna 104 or 106 is connected to a respective radio chain 108 or 110, respectively. Each radio chain 108 or 110 can include a radio frontend and a baseband processing unit. The radio frontend can refer to circuitry connected to an antenna that is used to process a signal at the original incoming radio frequency (RF), before the signal is converted. A baseband processing unit is used to process information in the baseband. A baseband refers to an original frequency of a signal before the signal is modulated onto a radio signal for propagation over the air. Information at this baseband can be recovered after receipt by a radio chain.

Although specific components are discussed above as being part of a radio chain, it is noted that in other examples, radio chains can include other types of components. More generally, a "radio chain" can refer to any type of circuitry implemented with one or multiple integrated circuit (IC) devices that can be used to process received radio signals, as received by an antenna, to recover information carried by the radio signals for use by other components of a wireless device, such as the wireless device 102. It is noted that a "radio chain" can also be considered to include the respective antenna as well.

The collection of the radio chains 108 and 110 and antennas 104 and 106 form a MIMO transceiver. More generally, a MIMO transceiver can refer to circuitry and antennas of a wireless device that is able to perform MIMO communications over the air.

As further shown in FIG. 1, the wireless device 102 includes a network discovery module 112, which can be implemented as machine-readable instructions executable on a processor (or multiple processors) 111 of the wireless device 102. A processor can include a microprocessor, a core of a multi-core microprocessor, a microcontroller, a programmable integrated circuit, a programmable gate array, or another hardware processing circuit.

Using the multiple radio chains 108, 110 and antennas 104, 106 to perform network discovery to identify just one wireless network can lead to increased power consumption that can deplete battery power of the wireless device 102. For example, if the multiple radio chains 108, 110 and antennas 104, 106, are used to send a probe request (or multiple probe requests) to discover a wireless network in a specific frequency band, then no real benefit can be derived from the use of the multiple radio chains and antennas, since the probe request(s) are directed to search for just one wireless network in a specific frequency band. For passive scanning, it can also be less power efficient to use multiple radio chains and antennas to listen for information transmitted by an AP in a wireless network of a specific frequency band.

In accordance with some implementations of the present disclosure, scanning to perform network discovery can be made more efficient if the MIMO components of the wireless device 102 are used as multiple single-input, single-output (SISO) transceivers, where such multiple SISO transceivers can be used to separately search for multiple wireless networks (such as multiple wireless networks in multiple respective different frequency bands). Thus, for example, the radio chain 108 and antenna 104 (which are part of a first SISO transceiver) can be used to perform scanning (active scanning or passive scanning) to detect a first wireless network (e.g., a first WLAN) in a first frequency band (e.g., the 2.4 gigahertz or GHz band). Concurrently, the radio chain 110 and antenna 106 (which are part of a second SISO transceiver) can be used to perform scanning to detect a second wireless network (e.g., a second WLAN) in a second frequency band (e.g., 3.5 GHz band or 5 GHz band).

In other examples, under control of the network discovery module 112, different wireless networks that can be concurrently scanned for by the MIMO transceiver of the wireless device 102 can have different characteristics other than different frequency bands. For example, different wireless networks can operate in different time intervals, operate using different codes, and so forth.

In examples where Wi-Fi Direct is used, a Wi-Fi Direct Device can use the multiple SISO transceivers to concurrently search for other Wi-Fi Direct Devices on multiple channels (e.g., different frequency bands, different time slots, different coded communication channels, etc.).

For active scanning, the network discovery module 112 can be used to initiate the transmission of probe requests using the separate SISO transceivers to search for different wireless networks having different characteristics (e.g. different frequency bands or other characteristics). The network discovery module 112 can determine whether probe responses, possibly corresponding to the probe requests, have been received to indicate the presence of wireless networks of the respective different characteristics.

The network discovery module 112 can also be used to perform passive scanning, in which the network discovery module 112 can control the separate SISO transceivers to listen for information from wireless networks having different characteristics.

In further examples, the MIMO transceiver of the wireless device 102 can be used to scan for just one wireless network. To achieve power savings, one of the SISO transceivers (e.g. the SISO transceiver 114 or 116) can be deactivated or placed into a lower power mode, so that just one SISO transceiver is used to perform discovery for one wireless network. In another example with more than two SISO transceivers, some of the SISO transceivers can be deactivated or placed in a low power mode, while leaving others SISO transceivers on to perform discovery.

The network discovery module 112 can be implemented at any of various different layers of the wireless device 102, such as the Medium Access Control (MAC) layer, a services layer, an application layer, and so forth.

Although the wireless device 102 is configured to implement a MIMO transceiver as multiple SISO transceivers when performing network discovery, after network discovery has completed and the wireless device 102 has associated with a wireless network, the MIMO transceiver can be used to perform MIMO communications of data over multiple paths with the wireless network. In further examples, once network discovery has completed, the MIMO transceiver can be used to perform MIMO communications of data over multiple paths with a wireless network, without the wireless device 102 being associated with the wireless network. The communications of data can occur over multiple separate paths, which achieves improved throughput. A wireless device associating with a wireless network can refer to the wireless device obtaining information relating to the wireless network that the wireless device then uses to establish a wireless connection with an AP (or multiple APs) of the wireless network.

Figure 2:
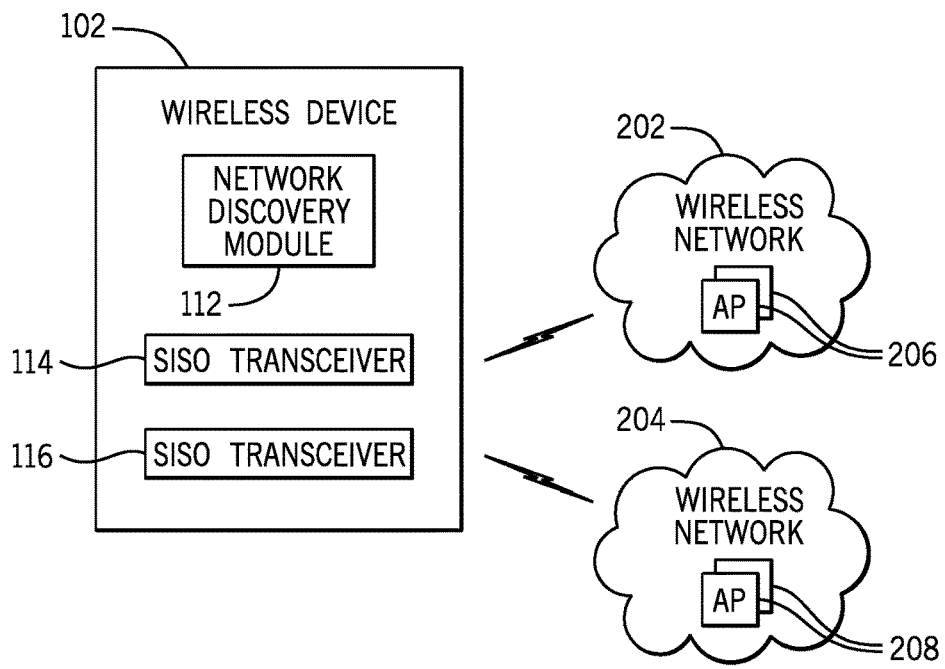
FIG. 2 is a block diagram of an example network arrangement that includes a wireless device and wireless networks, according to some implementations.

FIG. 2 is a block diagram of an example network arrangement that includes the wireless device 102 and wireless networks 202 and 204 of respective different frequency bands, for example. As examples, the wireless network 202 can operate in the 2.4 GHz band, while the wireless network 204 can operate in the 3.5 GHz or 5 GHz band. In a further example, the wireless networks 202 and 204 can operate on different frequencies (or channels) within the same frequency band, such as a lower and upper part of the 5 GHz band. The wireless network 202 includes one or more APs 206, and the wireless network 204 includes one or more APs 208.

The network discovery module 112 in the wireless device 102 can use the SISO transceiver 114 to perform scanning for the wireless network 202, and can use the SISO transceiver 116 to scan for the wireless network 204. The scanning for the different networks 202 and 204 by the SISO transceivers 114 and 116 can be performed concurrently.

Note that the network discovery module 112 is able to dynamically change the operation of each SISO transceiver 114 or 116, such that at a different time, the SISO transceiver 114 can be switched to scan for the wireless device 204, and the SISO transceiver 116 can be controlled to scan for the wireless device 202.

Figure 3:
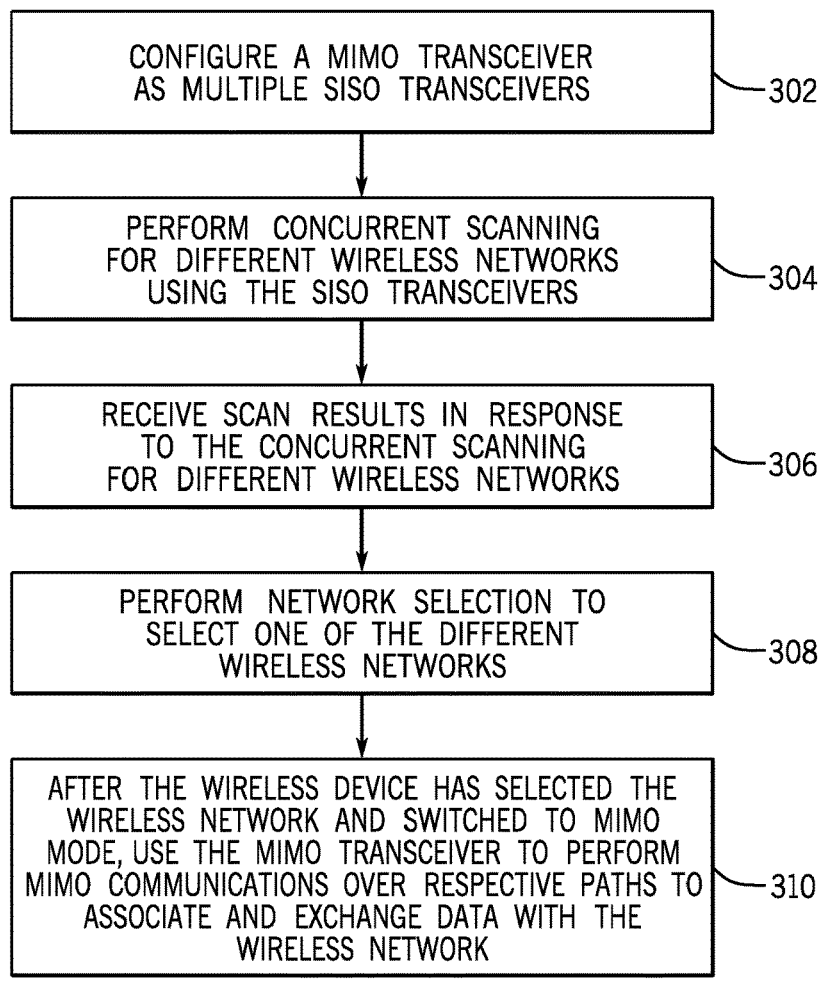
FIG. 3 is a flow diagram of an example process according to some implementations.

FIG. 3 is a flow diagram of an example process that can be performed by a wireless device 102 according to some implementations. To perform network discovery while the wireless device 102 is not associated with any wireless network, the network discovery module 112 executed on the processor(s) 111 in the wireless device 102 configures (at 302) a MIMO transceiver as multiple SISO transceivers. Configuring the MIMO transceiver as multiple SISO transceivers can refer to setting control instructions in the wireless device 102 to use the individual radio chains and antennas separately as individual SISO transceivers such that communications with one SISO transceiver can be independent of communications with another SISO transceiver.

The network discovery module 112 then performs (at 304) concurrent scanning (active scanning or passive scanning) for different wireless networks using the SISO transceivers. In a further example, active scanning and passive scanning can be performed separately on the independent SISO transceivers. For example, a first SISO transceiver is used to perform active scanning, while a second SISO transceiver is used to perform passive scanning.

The network discovery module 112 receives (at 306) scan results in response to the concurrent scanning for different wireless networks. For example, the wireless device 102 can receive multiple SSIDs that identify respective different wireless networks.

Assuming that multiple wireless devices have been discovered, the wireless device 102 can perform (at 308) network selection to select one of the multiple wireless networks that have been discovered. The network selection can be performed by a network selection module (not shown) which can be implemented with machine-readable instructions executable on the processor(s) 111. The network discovery module 112 can provide the scan results (containing information of the multiple wireless devices) to the network selection module, which can select one of the multiple different discovered wireless networks according to one or more criteria (e.g. user preference criterion specifying which wireless network is preferred, signal strength criterion specifying that the wireless network wireless signals having the highest strength is selected, and/or other criteria).

After the wireless device 102 has selected the wireless network and switched to MIMO mode, the wireless device 102 can use (310) the MIMO transceiver to perform MIMO communications over respective paths to associate and exchange data with the wireless network.

FIG. 3 shows an example where multiple SISO transceivers of the MIMO transceiver can be used to concurrently discover multiple different wireless networks. More generally, multiple SISO transceivers of the MIMO transceiver in a wireless device can be used to concurrently discover multiple other wireless devices, where the other wireless devices can include APs in different wireless networks (e.g., WLANs) or different Wi-Fi Direct Devices.

In further examples, the scanning that can be performed by the wireless device 102 can include scanning for hidden networks. A hidden network is a wireless network that is set to not broadcast its name (or SSID). To perform discovery of a hidden network, the wireless device 102 broadcasts both the name of the wireless network that the wireless device is looking for, as well as the wireless device's name, and security credentials for the hidden network. If the hidden network is in range, then the wireless device 102 can associate with the hidden network. The MIMO transceiver of the wireless device 102 can be configured to concurrently scan for multiple different hidden networks, or alternatively, to concurrently scan for a hidden network and a non-hidden wireless network.

In addition to or instead of performing scanning to perform wireless network discovery, the wireless device 102 can configure the MIMO transceiver into separate SISO transceivers that concurrently perform respective different tasks. For example, one of the SISO transceivers can be used to perform wireless network discovery to find a wireless network, while another of the SISO transceivers can be used to perform other tasks that are different from wireless network discovery. For example, such other tasks can involve send a specific query, such as a Generic Advertisement Service (GAS) query, an Access Network Query Protocol (ANQP) request, a Neighbor Awareness Networking (NAN) query, a Fast Initial Link Setup (FI LS) query, or other queries, together with the receiving of the corresponding responses. Such other tasks can be performed prior to association of the wireless device 102 with any wireless network.

GAS is a protocol provided by IEEE 802.11, and provides over-the-air transportation for frames of higher-layer advertisements between WLAN stations (STAs) or between a server in an external network and a WLAN station. The purpose of GAS is to enable a station to send a GAS query to identify the availability of information related to network services provided by a wireless network, while the station is in a pre-associated or unassociated state. GAS defines a generic container to advertise network services information over an IEEE 802.11 network.

The wireless device 102 is able to send an ANQP request, which is a form of query, to an AP of a wireless network. In response to the ANQP request, the AP can send to the wireless device 102 information elements that describe the services available at the wireless network. The wireless device 102 can use ANQP to obtain such information without having to associate with the wireless network, e.g. while the station is in a pre-associated or unassociated state.

NAN relates to a network that can be established among wireless devices that are in close proximity. A NAN query can be sent by the wireless device 102 to discover other NAN devices.

An FILS query can be sent by the wireless device 102 to establish a wireless connection with a wireless network within a relatively short time duration, e.g., 100 milliseconds.

Figure 4:
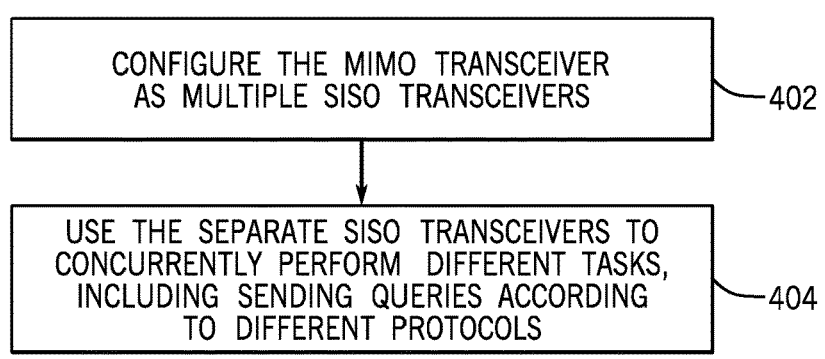
FIG. 4 is a flow diagram of another example according to further implementations.

FIG. 4 is a flow diagram of an example process according to further implementations that can be performed by the wireless device 102. The wireless device 102 can configure (at 402) the MIMO transceiver in the wireless device 102 as separate SISO transceivers. The wireless device 102 can then use (at 404) the separate SISO transceivers to concurrently perform different tasks, where the different tasks can include sending queries according to different protocols. A first task of the different tasks can include performing network scanning to discovery a wireless network according to a network discovery protocol (e.g. IEEE 802.11 discovery or discovery of another type of network). A second task of the different tasks can include sending a query according to another protocol, such as any one or more of a GAS query, an ANQP request, a NAN query, and a FILS query.

In other examples, the first task can include sending a query according to a first protocol, and the second task can include sending a query according to a second protocol.

Instructions of the network discovery module 112 and other modules of the wireless device 102 can be stored in respective storage devices, which are implemented as one or multiple computer-readable or machine-readable storage media. The storage media include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:
1. A wireless device comprising:
a multiple-input, multiple-output (MIMO) transceiver comprising a plurality of antennas; and
at least one processor configured to:
concurrently perform discovery of respective different wireless devices using at least two antennas of the plurality of antennas by using a first antenna of the at least two antennas to discover a first wireless device of the different wireless devices, and using a second antenna of the at least two antennas to discover a second wireless device of the different wireless devices;
use, concurrently with the performing of the discovery of at least one of the respective different wireless devices using at least one of the at least two antennas and prior to association of the wireless device with any wireless network, at least one of the other of the plurality of antennas to acquire information about services provided by a wireless network, wherein acquiring information about the services provided by the wireless network is part of a task different from network discovery; and
use the MIMO transceiver to perform single-input, single-output (SISO) operations prior to association of the wireless device with the wireless network.

2. The wireless device of claim 1, wherein the at least one processor is configured to use the first antenna to send a first discovery request, and to use the second antenna to send a second discovery request.

3. The wireless device of claim 1, wherein the at least one processor is configured to use the first antenna to listen for discovery information from the first wireless device and to use the second antenna to listen for discovery information from the second wireless device.

4. The wireless device of claim 1, wherein the first and second wireless devices are different Wi-Fi Direct Devices.

5. The wireless device of claim 1, wherein the first and second wireless devices are different access points (APs) of respective different wireless networks.

6. The wireless device of claim 5, wherein the at least one processor is configured to further:
use, prior to association of the wireless device with any wireless network, another of the plurality of antennas to discover a device in a Neighbor Awareness Networking (NAN) network.

7. The wireless device of claim 5, wherein the at least one processor is configured to further:
use, prior to association of the wireless device with any wireless network, another of the plurality of antennas to perform Fast Initial Link Setup (FILS) with at least one of the respective APs.

8. The wireless device of claim 1, wherein the at least one processor is configured to further:
after the discovery and after the wireless device has associated with the wireless network, use the plurality of antennas to perform MIMO wireless communication of information over respective paths of multiple paths.

9. The wireless device of claim 5, wherein the at least one processor is configured to further:
receive scan results from first and second wireless networks in response to performing the discovery;
select, in response to the scan results, a wireless network of the first and second wireless networks; and
associate with the selected wireless network.

10. The wireless device of claim 5, wherein concurrently performing the discovery comprises performing a network discovery of a hidden network by the first antenna, and performing a network discovery of a non-hidden network by the second antenna.

11. The wireless device of claim 5, wherein the different wireless networks operate in different frequency bands.

12. A method of a wireless device, comprising:
performing concurrent scanning for different wireless devices using respective individual SISO transceivers of a multiple-input, multiple-output (MIMO) transceiver by using a first SISO transceiver of the individual SISO transceivers to scan for a first wireless device of the different wireless devices, and using a second SISO transceiver of the individual SISO transceivers to scan for a second wireless device of the different wireless devices;
concurrently with the scanning for at least one of the different wireless devices using at least one of the respective individual SISO transceivers, using at least one of the other of the individual SISO transceivers to acquire information about services provided by a wireless network, wherein acquiring information about the services provided by the wireless network is part of a task different from network discovery; and using the MIMO transceiver to perform single-input, single-output (SISO) operations prior to association of the wireless device with the wireless network.

13. The method of claim 12, wherein the concurrent scanning for the different wireless devices comprises concurrent scanning for access points (APs) of different wireless networks in different frequency bands.

14. The method of claim 12, wherein the concurrent scanning comprises one or more of concurrent active scanning and passive scanning.

15. The method of claim 12, wherein the wireless devices are access points (APs) of different wireless networks.

16. A non-transitory machine-readable storage medium storing instructions that upon execution cause a wireless device to:
concurrently perform different tasks using respective individual SISO transceivers of a multiple-input, multiple-output (MIMO) transceiver, the different tasks comprising sending queries according to different protocols,
wherein the different tasks comprise wireless network discovery to discover a first wireless network using a first SISO transceiver of the individual SISO transceivers, wireless network discovery to discover a second wireless network using a second SISO transceiver of the individual SISO transceivers, and sending, using at least one of the other of the individual SISO transceivers, a Generic Advertisement Service (GAS) query or an Access Network Query Protocol (ANQP) request to obtain information of a network service provided by a wireless network; and
use the MIMO transceiver to perform single-input, single-output (SISO) operations prior to association of the wireless device with the wireless network.

17. The non-transitory machine-readable storage medium of claim 16, wherein the different tasks further include another task selected from the group selected from among sending a Neighbor Awareness Networking (NAN) query and sending a Fast Initial Link Setup (FILS) query.

18. The non-transitory machine-readable storage medium of claim 16, wherein sending the GAS query or the ANQP query is prior to association of the wireless device with any wireless network.

19. The wireless device of claim 1, wherein the using of the at least one of the other of the plurality of antennas to acquire information about the services provided by the wireless network comprises using the at least one of the other of the plurality of antennas to send, by the wireless device prior to the association of the wireless device with any wireless network, a Generic Advertisement Service (GAS) query or an Access Network Query Protocol (ANQP) query to the wireless network to acquire the information about the services provided by the wireless network.

20. The method of claim 12, wherein using the at least one of the other of the individual SISO transceivers to acquire information about the services provided by the wireless network is performed prior to association of the wireless device with any wireless network and comprises sending a Generic Advertisement Service (GAS) query or an Access Network Query Protocol (ANQP) query to the wireless network.

* * * * *